Nov. 14, 1967

C. B. TRIMBLE 3,353,116

ELECTRO-OPTICAL OSCILLATOR

Filed Jan. 25, 1965

INVENTOR
CEBERN B. TRIMBLE
BY *Louis A. Kline*
*Albert L. Sessler, Jr.*
HIS ATTORNEYS Nov. 14, 1967     C. B. TRIMBLE     3,353,116
ELECTRO-OPTICAL OSCILLATOR Filed Jan. 25, 1965     7 Sheets-Sheet 5

INVENTOR
CEBERN B. TRIMBLE

BY

HIS ATTORNEYS

United States Patent Office 3,353,116
Patented Nov. 14, 1967

3,353,116
ELECTRO-OPTICAL OSCILLATOR
Cebern B. Trimble, Xenia, Ohio, assignor to The National Cash Register Company, Dayton, Ohio, a corporation of Maryland
Filed Jan. 25, 1965, Ser. No. 427,901
21 Claims. (Cl. 331—107)

ABSTRACT OF THE DISCLOSURE

An electro-optical oscillator having a variable frequency and employing electroluminescent and photoconductive elements. Several embodiments of the oscillator are shown, all of which vary the frequency by varying the number of effective stages of the oscillator. Switches are employed to select the particular stage which provides the feedback to the input stage of the oscillator.

---

This invention relates generally to oscillator circuits, and more particularly relates to electro-optical implementations of such circuits.

Electro-optical circuitry has potential use in a large number of different applications such as, for example, data processing systems, for reasons which include low cost, ease of fabrication, and electrical isolation between optically-coupled elements. The subject of the present invention is an oscillator, which is fabricated from electro-optical elements and which may be adjusted to vary the frequency of oscillation.

In the present invention, radiation-emitting elements, such as electroluminescent elements, are coupled to radiation-sensitive elements, such as photoconductive elements, in such manner that an electrical input signal applied to an electroluminescent element causes radiation, which radiation impinges on a photoconductive element to change its operating characteristics.

Electroluminescence is a well-known property of certain phosphors, which causes them to emit radiation when excited by a change in potential gradient across the phosphors. Other suitable types of radiation-emissive components, such as glow discharge devices, particularly neon glow tubes, for example, may be used in the present invention in place of the electroluminescent phosphors.

As is also well known, illumination of a photoconductive element greatly affects the electrical internal resistance of such an element. An element which is dark, or only dimly illuminated, has a very high resistance, while one which is illuminated by suitable radiation has a resistance which is relatively low with respect to its dark resistance. Other components which are capable of changing certain physical or electrical characteristics upon exposure to radiation, such as photodiodes, phototransistors, solar cells, bolometers, etc., could be used in the present invention.

In accordance with the present invention, an output signal, the frequency of which may be selectively varied, is produced by an oscillator comprising a combination of radiation-sensitive elements and radiation-emitting elements combined and optically coupled to function according to a predetermined sequence of operation. A number of different embodiments are disclosed in the present application. In each embodiment, means are provided for varying the frequency of the oscillating signal by varying the number of effective stages in the oscillator circuit.

It is accordingly an object of the present invention to provide an electro-optical oscillator of simple, efficient design.

Another object is to provide an electro-optical oscillator having a variable period of oscillation.

A furhter object is to provide an electro-optical oscillator using photoconductive and electroluminescent elements.

An additional object is to provide an electro-optical oscillator in which a variable period of oscillation is achieved by varying the number of effective stages in the oscillator.

Other objects will become apparent from the following description and claims, and the accompanying drawings, which disclose, by way of example, certain preferred embodiments of the invention.

Figure 1:
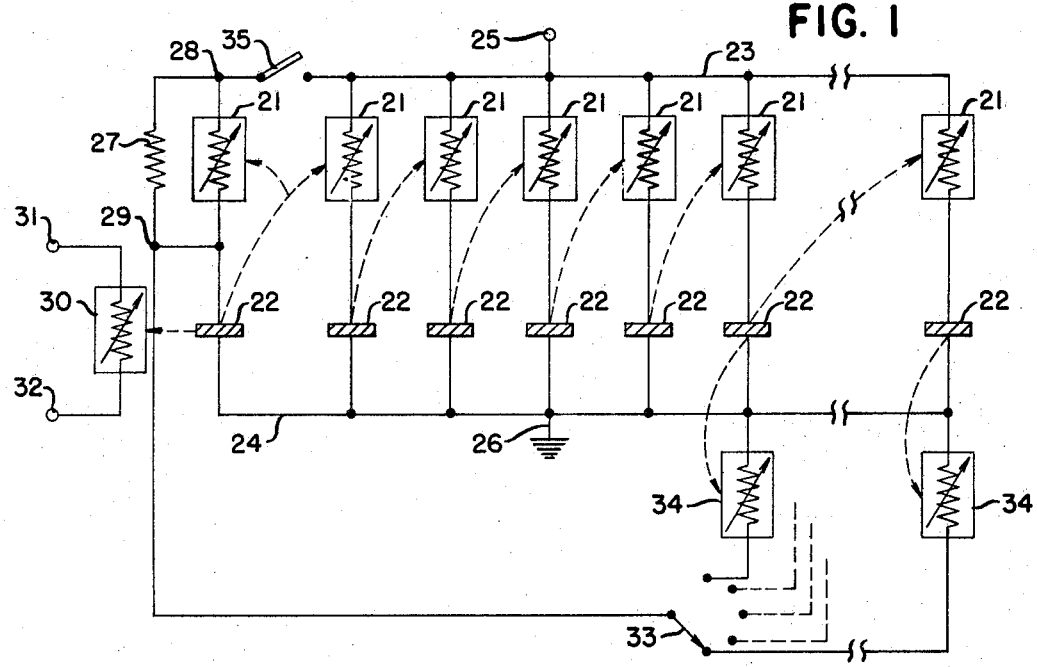
FIG. 1 is a schematic circuit diagram of one form of electro-optical oscillator.

Referring now to the drawings, one embodiment of an electro-optical oscillator constructed in accordance with the present invention is shown in FIG. 1. In this device, an output signal of predetermined frequency is periodically repeated, in the form of an emission of radiation from an energized electroluminescent element, once the device has been started in operation. The frequency of the signal can be selectively varied, as will subsequently be described.

In the following description of this and other embodiments of electro-optical oscillators, it should be understood that where reference is made to an electroluminescent element, this is intended to cover other suitable types of radiation-emissive elements, such as neon tubes, and the invention is not intended to be limited to electroluminescent elements as such. Similarly, where reference is made to a photoconductive element, this is intended to cover any suitable type of element, the impedance of which is altered by exposure of the element to radiation of a suitable wave length; and in addition is intended to cover any suitable type of element in which a voltage is generated by exposure of the element to radiation of a suitable wave length, such as a photovoltaic cell, or "solar" cell. Specific structures for the various photoconductive elements and electroluminescent elements have not been disclosed herein, but these structures are well known, and reference may be had to various publications in the field for suitable structures. For example, suitable structures for electroluminescent elements and photoconductive elements are disclosed in United States Patent No. 3,146,352, patented Aug. 25, 1964, by Cebern B. Trimble, the present inventor.

In the oscillator circuit of FIG. 1, a number of sets consisting of a photoconductive element 21 in series with an electroluminescent element 22 are electrically connected in parallel between first and second common conductors 23 and 24, which in turn are connected to a source of A.C. power, here represented by a terminal 25, to which the first conductor 23 is connected, and a connection 26 to a base reference potential, shown here as ground, of the second conductor 24. It should be noted that the various electroluminescent elements and photoconductive elements are physically arranged with respect to each other so as to provide optical coupling between elements according to the various dashed, arrow-headed lines appearing in FIG. 1.

Each serial combination of a photoconductive element 21 and an electroluminescent element 22 connected between the conductors 23 and 24 may be considered to be a stage, with the first stage located at the left, as viewed in FIG. 1. The electroluminescent element 22 of each stage is optically coupled to the photoconductive element 21 of the next succeeding stage, as may be seen from the dashed lines in FIG. 1. In addition, the electroluminescent element 22 of the first stage is also optically coupled to the photoconductive element 21 of that stage. Between the first and second stages, a switch 35 is positioned in the conductor 23, and serves to initiate operation of the oscillator, as will subsequently be described. A resistor 27 is connected between points 28 and 29 in parallel with the photoconductive element 21 of the first stage.

As shown in FIG. 1, an output signal is developed on a photoconductive element 30, which is optically coupled to the electroluminescent element 22 of the first stage, and which is connected between output terminals 31 and 32. It will, of course, be realized that the output element could be associated with any of the electroluminescent elements 22 of the circuit, and that, if desired, more than one output signal could be taken from the circuit, by associating a plurality of photoconductive output elements with one or more of the electroluminescent elements. These could be used, for example, to provide the various clock pulses required in operation of shift registers and other components of various types of electronic systems. The phase relation between the various output signals could be determined by proper selection of the stages from which the output signals were taken, as will subsequently be described.

From the point 29, a path extends to the common of a multiple-position switch 33, the various contacts of which are connected over photoconductive elements 34, which serve a circuit-resetting function, as will subsequently be described, to the conductor 24. Any desired number of stages may be included in the oscillator of FIG. 1, as indicated by the broken lines representing the conductors 23 and 24, as well as the various conductors connecting the contacts of the switch 33 to the photoconductive elements 34. Each photoconductive element 34 is optically coupled to the electroluminescent element 22 of a corresponding stage, as indicated by the dashed lines extending between the respective elements. The frequency of the output signal developed by the oscillator of FIG. 1 is dependent upon the number of "effective" stages in the oscillator, determined by the setting of the switch 33, as will be described.

Figure 2:
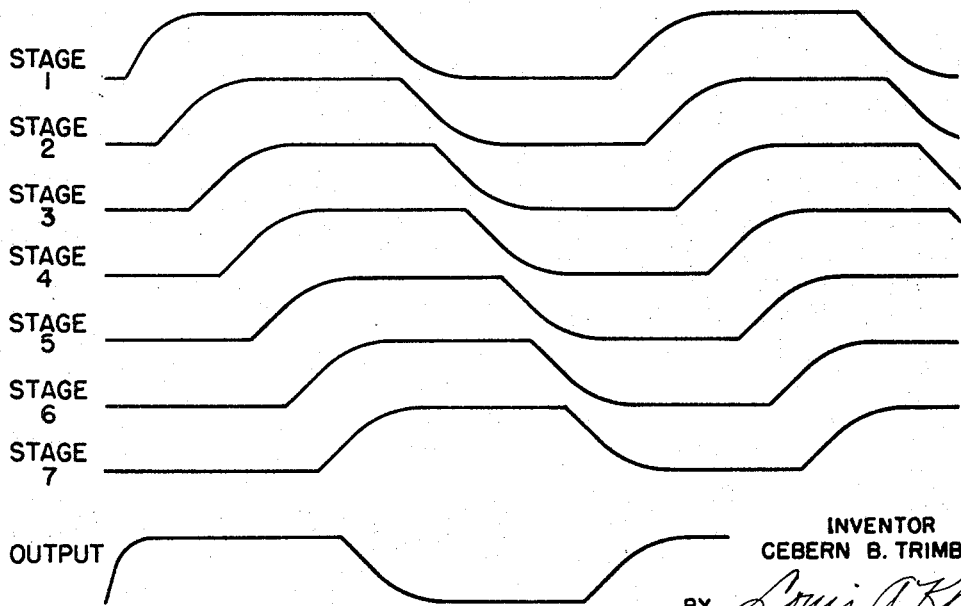
FIG. 2 shows a plurality of wave forms associated with various elements of the circuit shown in the diagram of FIG. 1.

The operation of the oscillator of FIG. 1 will now be explained with reference to the various wave forms shown in FIG. 2. The bottom wave form represents the intensity of illumination on the output photoconductive element 30, which is inversely proportional to the resistance of said element. The remainder of the wave forms of FIG. 2 represent the intensity of radiation emitted by the electroluminescent elements 22 of the various stages. The stages are identified at the left of the wave forms of FIG. 2.

In the inactive condition of the circuit of FIG. 1, the switch 35 is opened. All of the electroluminescent elements 22 are in an "off" condition, and no output signal is being generated. When the switch 35 is closed to initiate operation of the oscillator circuit of FIG. 1, the first stage electroluminescent element 22 is caused to commence the emission of radiation, due to the resistance of the resistor 27. The value of the resistance of the resistor 27 for design purposes is essentially the geometric mean of the dynamic resistance of the photoconductive element when illuminated and the dynamic resistance of said element when dark. For example, the resistance of the element 21 when illuminated may be $10^5$ ohms, and the resistance of that element when dark may be $10^9$ ohms, thereby yielding a geometric mean resistance of $10^7$ ohms from the equation $R_{geo.} = \sqrt{R_{light} \cdot R_{dark}}$. The relatively low resistance of this resistor in effect provides a shunt for the photoconductive element 21 of the first stage, which is in a "dark," or high-resistance, condition as the operation of the oscillator of FIG. 1 commences. The radiation emitted by the electroluminescent element 22 of the first stage is applied, as shown by the dashed lines of FIG. 1, both to the photoconductive element 21 of the first stage and to the photoconductive element 21 of the second stage. Application of radiation from the electroluminescent element 22 of the first stage to the photoconductive element 21 of the first stage causes the resistance of that element to drop sharply, thus providing a low-resistance path between the terminal 25 and the ground connection 26 over the closed switch 35, the point 28, and the photoconductive element 21 to apply a large potential across the electroluminescent element 22 of the first stage, thus causing said element to become fully illuminated. The low resistance of the photoconductive element 21 of the first stage in effect "locks on" the electroluminescent element 22.

As has been mentioned, the electroluminescent element 22 of the first stage also illuminates the photoconductive element 21 of the second stage. This provides a low-resistance path to enable the electroluminescent element 22 of the second stage to become energized. Radiation emitted by the electroluminescent element 22 of the second stage is applied to the photoconductive element 21 of the third stage, since said elements are optically coupled as shown in FIG. 1. Accordingly, the electroluminescent element 22 of the third stage is energized and commences to emit radiation. This sequence is repeated down the line from stage to stage, until the photoconductive element 21 for the sixth stage is illuminated. At this point it will be observed that the electroluminescent element 22 for the sixth stage, when energized, illuminates two photoconductive elements; namely, the photoconductive element for the next succeeding stage, and the photoconductive element 34 corresponding to the sixth stage. All stages beyond the sixth stage are identical, and all are connected over photoconductive elements 34 to contacts of the switch 33.

It will be noted that, according to the setting of the common, or wiper, of the switch 33, one of the photoconductive elements 34 will be connected in parallel with the electroluminescent element 22 of the first stage. Whichever photoconductive element 34 is selected by the setting of the switch 33 is illuminated as the sequential operation of the oscillator circuit of FIG. 1 continues. Let it be assumed, as shown in FIG. 1, that the switch 33 is set to its lowest contact, and that the photoconductive element 34 of the rightmost stage is accordingly connected in parallel with the electroluminescent element 22 of the first stage. Accordingly, when the electroluminescent element 22 of the rightmost stage is energized, the photoconductive element 34 of the rightmost stage is illuminated by the optical coupling between it and its corresponding electroluminescent element 22, thus providing a low-resistance path between the ground connection 26 and the point 29. This causes a large decrease in the potential applied across the electroluminescent element 22 of the first stage, which results in the radiation from said element being drastically reduced to a level which, for the sake of convenience, will be hereinafter referred to as the deenergized condition, although, in fact, a small amount of radiation is still being emitted from said element.

Deenergization of the electroluminescent element 22 of the first stage causes an increase in resistance in the photoconductive element 21 of the second stage, due to the substantial reduction of illumination on said element from the electroluminescent element 22 of the first stage. This results in the deenergization of the electroluminescent element 22 of the second stage, which in turn causes a substantial reduction of illumination of the photoconductive element 21 of the third stage, to increase its resistance. This action continues sequentially from stage to stage through the oscillator circuit of FIG. 1 until the electroluminescent element 22 of the rightmost stage is deenergized. When this happens, the low-resistance path in parallel with the electroluminescent element 22 of the first stage becomes a relatively high-resistance path, due to the increase in resistance of the photoconductive element 34 associated with the rightmost stage. This is effective to cause the electroluminescent element 22 of the first stage to be energized, and the whole cycle commences once again. The cycle of the electroluminescent elements of the various stages being successively energized, and then successively deenergized, continues indefinitely until the switch 35 is opened, at which time all of the electroluminescent elements 22 are deenergized, sequentially, and remain "off" until the switch is closed once more.

Because of the time lag of the various photoconductive elements in responding to the illumination applied to them over the optical coupling from the electroluminescent elements which illuminate them, there is a certain delay introduced by each stage of the oscillating circuit of FIG. 1. The circuit takes advantage of this delay to obtain frequency control by selectively introducing the desired number of additional stages through use of the switch 33, so that the number of "effective" stages can be determined by manipulation of the switch 33. Reference to FIG. 2 illustrates the manner in which the energization of the electroluminescent elements proceeds from stage to stage, as well as the manner in which these elements are deenergized successively from stage to stage.

When this circuit is observed visually, it appears as if a light wave is moving through the circuit as the electroluminescent elements turn on and off. Accordingly, the circuit has been termed a "traveling light wave" oscillator. It will be readily apparent that the aspect of having a visual indication of the state of a unit such as the oscillator is very useful in troubleshooting and servicing.

Figure 3:
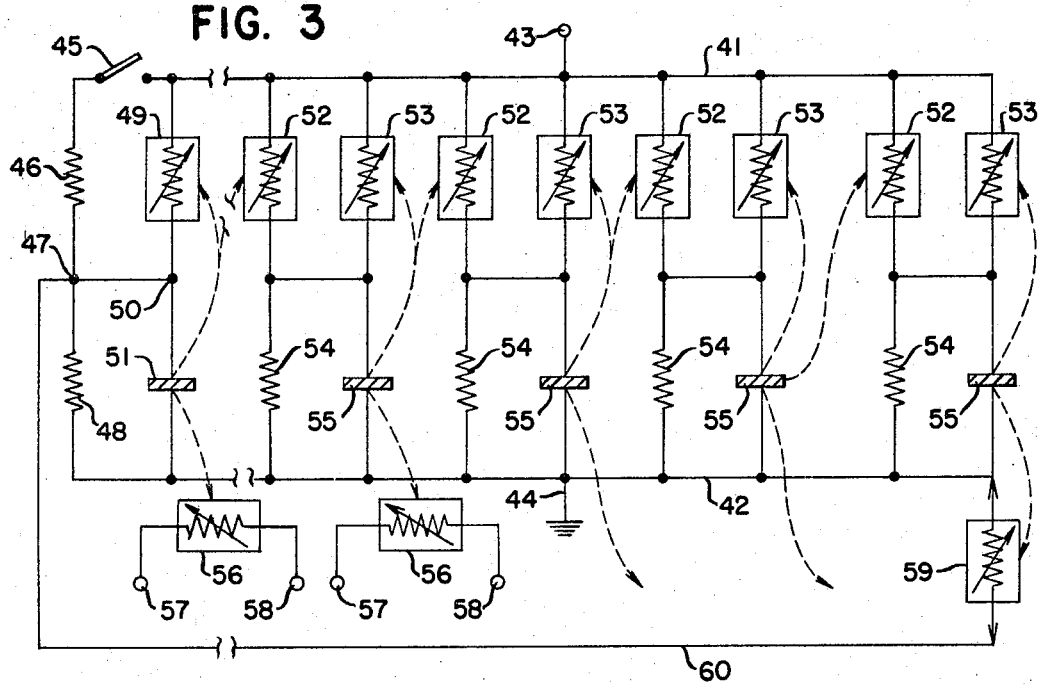
FIG. 3 is a schematic circuit diagram of a second form of electro-optical oscillator.

In FIG. 3 is shown another embodiment of an electro-optical oscillator constructed in accordance with the present invention. This circuit generally resembles the circuit of FIG. 1, and functions in a similar way, but differs from the circuit of FIG. 1 in the make-up of the individual stages, and in the means used to vary the frequency of oscillation of the output signal.

First and second common conductors 41 and 42 are provided in this circuit. As in the embodimnet of FIG. 1, these conductors are connected to a source of A.C. power, with the conductor 41 being connected to a terminal 43 and the conductor 42 being connected to a base reference potential, shown as ground, at 44. Also, as was the case in FIG. 1, and as is the case in all other embodiments of the invention included in the present application, the various electroluminescent elements and photoconductive elements are physically arranged with respect to each other so as to provide optical coupling between elements according to the various dashed, arrow-headed lines appearing in FIG. 3.

A switch 45 is connected at one end of the conductor 41 and provides a means for initiating operation of this embodiment of the oscillator, as will subsequently be described. From one side of the switch 45, a path extends over a resistor 46, a point 47, and a second resistor 48 to the conductor 42. From the other side of the switch 45, a path extends over a photoconductive element 49, a point 50, and an electroluminescent element 51 to the conductor 42. The points 47 and 50 are connected to each other.

The resistors 46 and 48, together with the photoconductive element 49 and the electroluminescent element 51, may be considered to comprise the first stage of the oscillator of FIG. 3. The remaining stages of the oscillator are identical to one another. Each consists of a parallel combination of two photoconductive elements 52 and 53 connected serially to a parallel combination of a resistor 54 and an electroluminescent element 55. As is apparent from FIG. 3, each stage is connected between the conductors 41 and 42.

A break is shown in the circuit of FIG. 3 immediately to the right of the first stage to indicate that any desired number of stages can be included in the oscillator, and that it is not limited to the specific number shown in FIG. 3. Generally speaking, the greater the number of stages included, the longer will be the period of oscillation of the output signals or signals, and therefore the lower will be the frequency.

Two separate output means are shown in the circuit of FIG. 3, each consisting of a photoconductive element 56, connected between output terminals 57 and 58. It will be recalled that this is the same type of output means as was shown in connection with the circuit of FIG. 1. One of these output means is shown associated with the first stage, while the other is shown associated with the stage immediately to the right of the break in the circuit. Of course, it will be realized that these output means could be located wherever desired in the circuit, and that any desired number of output means could be used in the circuit, depending upon the requirements of the system with which the oscillator is used. The circuit of FIG. 3 is also provided with means to vary the frequency of oscillation of the circuit by varying the number of "effective" stages in the circuit. This is accomplished by the provision of a photoconductive element 59, which is connected at one side to the conductor 42, and at its other side is connected over a conductor 60 to a point 47. The element 59 may be physically shifted so that it can be placed in optically-coupled relationship with any of the electroluminescent elements 55, to alter the frequency of the oscillation of the circuit in a manner which will be described subsequently.

As has been previously indicated, the dashed lines in FIG. 3 indicate the optical coupling of the various elements with respect to each other. It may be noted that the electroluminescent element 51 of the first stage is optically coupled to the photoconductive element 49 of that stage, to the photoconductive element 52 of the next succeeding stage, and to the photoconductive element 56 of the output means. The electroluminescent element 55 of succeeding stages are optically coupled to associated photoconductive elements 53 of the same stage and to the photoconductive element 52 of the next succeeding stage. In addition, certain of the electroluminescent elements 55 may be optically coupled to the output means 56, while one of the electroluminescent elements 55 is optically coupled to the photoconductive element 59 which is used to vary the frequency of oscillation of the circuit of FIG. 3, and to initiate a resetting operation when the electroluminescent element 55 of the last effective stage has been energized, as will subsequently be described.

The mode of operation of the oscillator circuit of FIG. 3 will now be described. No figure has been included in the drawings showing the wave forms associated with the various elements of this circuit. However, these wave forms are generally similar to the wave forms shown in FIG. 2 for the circuit of FIG. 1, and a specific showing of them is therefore deemed to be unnecessary.

In the circuit of FIG. 3, optical coupling between the electroluminescent element of a given stage and one of the photoconductive elements of the same stage provides a "feed-back" which is used to maintain the electroluminescent element in an "on" or energized condition, by illumination of said photoconductive element. However, the resistance value of the resistor included in each stage is such that the second photoconductive element of each stage, which is optically coupled to the electroluminescent element of the preceding stage, must also be illuminated in order for the electroluminescent element of the given stage to remain energized. This produces a more rapid turning on and turning off of the electroluminescent elements than is achieved in the oscillator circuit of FIG. 1.

With power applied to the circuit of FIG. 3, and the switch 45 open, all of the electroluminescent elements 51 and 55 are in an "off" or deenergized state. When the switch 45 is closed, the resistors 46 and 48, which may have resistances on the order of 10 megohms each, divide the applied voltage, so that approximately one half of said voltage is applied between the point 50 and the conductor 42 to energize the electroluminescent element 51. The optical coupling between the electroluminescent element 51 and the photoconductive element 49 causes the latter element to be illuminated, so that its resistance is greatly decreased. This, in effect, "locks on" the electroluminescent element 51. Also optically coupled to the electroluminescent element 51 is the photoconductive element 52 of the next stage. Illumination of the element 52 reduces its resistance sufficiently to cause the electroluminescent element 55 of that stage to be energized. The element 55 then "locks on" by illuminating the photoconductive element 53 of the same stage, and also illuminates the photoconductive element 52 of the next stage to cause the electroluminescent element 55 of that stage to be energized. The energization of electroluminescent elements of successive stages thus proceeds sequentially through the circuit of FIG. 3 to the last "effective" stage of the circuit.

As has been previously mentioned, the photoconductive element 59, which serves a resetting function in the circuit of FIG. 3, can be adjusted in position from stage to stage to be placed in optically-coupled relation with the electroluminescent element of the stage that will give the desired frequency of the output signal or signals. The movable element 59 thus serves the same function for the circuit of FIG. 3 that the switch 33, in combination with the photoconductive elements 34, does for the circuit of FIG. 1.

For purposes of illustration, let it be assumed that the photoconductive element 59 is positioned in optically-coupled relationship with the electroluminescent element 55 of the final stage of the oscillator circuit, as shown in FIG. 3. Then, when the element 55 of the final stage is energized in the sequential operation of the circuit, the photoconductive element 59 is illuminated and changes from a high-resistance state to a low-resistance state. Since the element 59 is connected in parallel with the electroluminescent element 51 of the first stage, the potential across the element 51 is substantially decreased, thereby deenergizing said electroluminescent element, so that it goes to the "off" condition and no longer emits radiation to the photoconductive elements 49 and 52.

The termination of illumination on the photoconductive element 52 of the second stage causes resistance of that element to increase substantially, thereby decreasing the potential across the electroluminescent element 55 of the second stage, which results in a decrease in the radiation emitted by it. Accordingly, the photoconductive element 53 of the second stage increases in resistance, since the radiation which it receives over the optical coupling with the element 55 is decreased. This decreases the potential across the element 55 still more, and accelerates the rate of its deenergiaztion to a deenergized or "off" condition, in which it emits very little radiation.

It may be noted that this sequence of operation will be propagated through successive stages of the circuit until that stage is reached which is coupled to the resetting photoconductive element 59. The stage coupled to the element 59 is designated the last "effective" stage. When illumination of the element 59 is greatly reduced, causing an increase in resistance of said element, then the potential across the electroluminescent element 51 of the first stage is increased, resulting in the reenergization of said element.

The operating sequence previously described, of energization of electroluminescent elements of successive stages, is thus commenced once again. It will be seen that the operation of the circuit will continue without interruption so long as power is applied thereto and the switch 45 remains closed. As previously mentioned, output signals may be taken from photoconductive elements 56 which are optically coupled to any of the electroluminescent elements 51 and 55, in accordance with the number of outputs required for a given use, and the phase relationship of said outputs with respect to each other. It may be noted that a desired phase relationship between output signals can be achieved by coupling the output elements 56 to stages which are separated from each other by intervening stages, in accordance with the difference in phase which is required.

Figure 4:
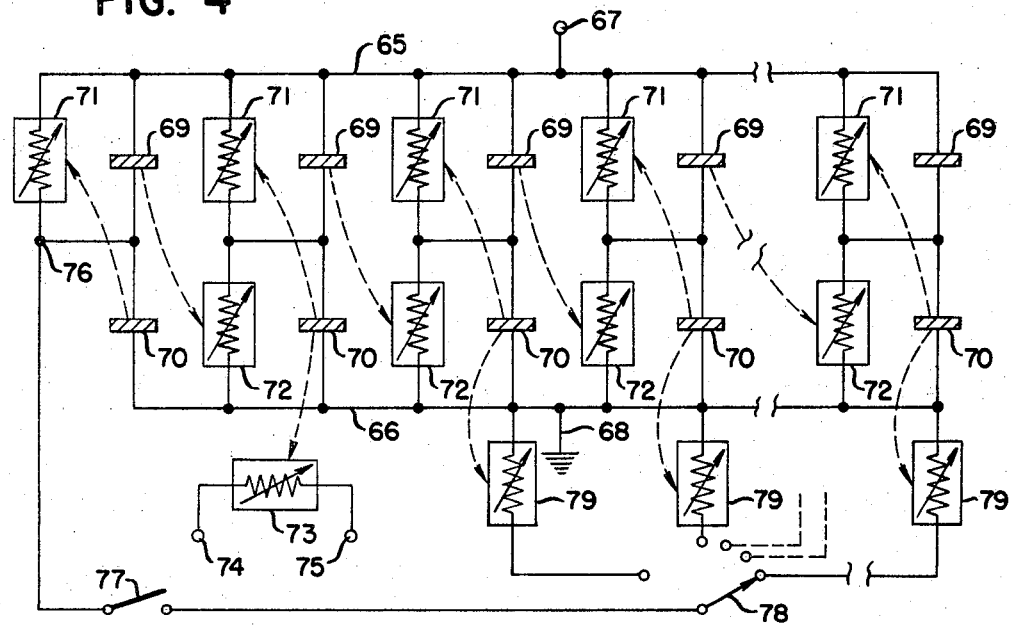
FIG. 4 is a schematic circuit diagram of a third form of electro-optical oscillator.

Shown in FIG. 4 is another embodiment of an electro-optical oscillator constructed in accordance with the present invention. This circuit differs from the circuits of FIGS. 1 and 3 in providing a distinctive circuit in which no conventional resistors are used, with all of the resistive elements being of the radiation-sensitive or photoconductive type.

First and second common conductors 65 and 66 are provided in this circuit and are connected to a source of A.C. power, the conductor 65 being connected to a terminal 67 and the conductor 66 being connected to a base reference potential, shown as ground, at 68. Connected between the conductors 65 and 66 are a number of stages, each containing first and second electroluminescent elements 69 and 70 in series, and a photoconductive element 71 in parallel with the electroluminescent element 69. In every stage except the first, an additional photoconductive element 72 is provided in parallel with the electroluminescent element 70. The electroluminescent elements 70 of each stage are optically coupled to the photoconductive elements 71 of the same stage, while the electroluminescent elements 69 of each stage are optically coupled to the photoconductive elements 72 of the next succeeding stage. As indicated by the break shown in FIG. 4, the oscillator circuit can have any desired number of stages in accordance with the frequency of the output signal which it is desired to achieve.

The output signal or signals for the oscillator circuit of FIG. 4 may be developed on one or more photoconductive elements 73, which are optically coupled to the electroluminescent elements 70 of selected stages, and which are connected between output terminals 74 and 75. As has been noted in the description of other embodiments, any desired number of output signals can be produced by the circuit of FIG. 4, by the use of a number of the photoconductive elements 73. Also, any desired phase difference between output signals may be achieved by the selection of the stages to which the elements 73 are optically coupled.

From a point 76, located at the junction of the elements 69, 70, and 71 of the first stage, a circuit path extends over a switch 77, which is used to initiate operation of the oscillator of FIG. 4, to the common, or wiper, of a multiple-position switch 78, the various contacts of which are connected over photoconductive elements 79 to the conductor 66. Each photoconductive element 79 is optically coupled to one of the electroluminescent elements 70. The frequency of the output signal developed by the oscillator of FIG. 4 is dependent upon the number of "effective" stages in the oscillator, and this, in turn, is controlled by the setting of the switch 78.

Figure 5:
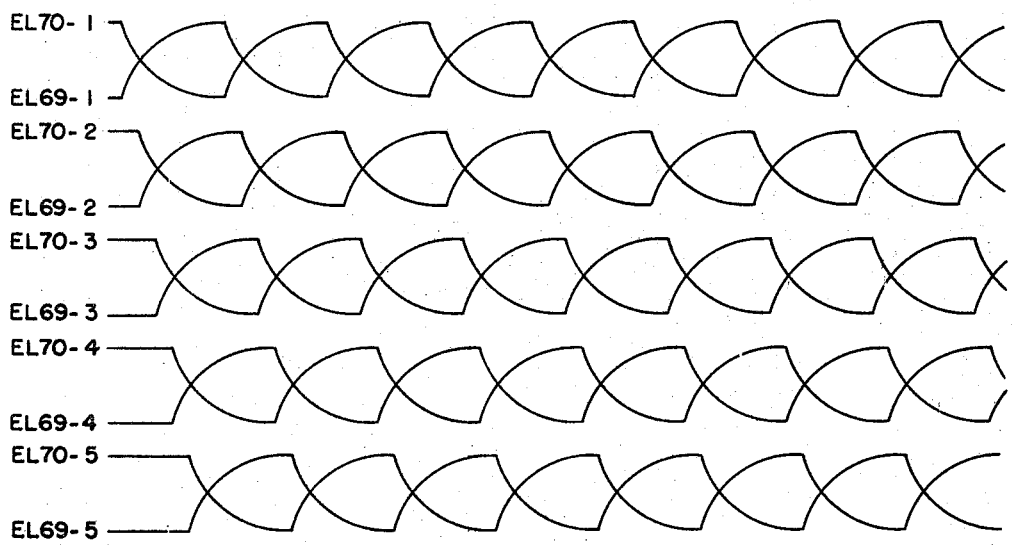
FIG. 5 shows a plurality of wave forms associated with various elements of the circuit shown in the diagram of FIG. 4.

The mode of operation of the oscillator circuit of FIG. 4 will now be described, with the aid of the wave forms shown in FIG. 5. These wave forms represent the intensity of radiation emitted by the electroluminescent elements in the circuit during a number of cycles of operation. Wave forms for the various electroluminescent elements are identified by the reference characters of the elements and the stages in which they are located. For example, the wave form designated "EL69–3" is associated with the electroluminescent element 69 in the third stage.

Let it first be assumed that the circuit of FIG. 4 is connected to a suitable power supply, and that the switch 77 is open. In such a case, all of the electroluminescent elements 70 are energized, or "on," while all of the electroluminescent elements 69 are deenergized, or "off." This is true due to the feed-back optical coupling in each stage between the electroluminescent element 70 and the photoconductive element 71, which causes the element 70 to prevail always over the element 69 in energization when power is supplied to the stage with the switch 77 open. When power is initially supplied, both elements 69 and 70 are energized to some degree. However, the optical coupling of elements 70 and 71 causes illumination on the photoconductive element 71, decreasing its resistance and thereby decreasing the potential across the element 69 and increasing the potential across the element 70. This action is cumulative, so that after a short period, the electroluminescent element 69 is substantially deenergized or "off," while the electroluminescent element 70 is substantially fully energized, or "on."

When the switch 77 is closed, a path is completed from the point 76 over the switch 77, the switch 78, and the photoconductive element 79 corresponding to the contact position to which the wiper of the switch 78 is set, to the conductor 66, and thence to ground. Since the photoconductive element 79 in this path is in a low-resistance state, due to being illuminated by the electroluminescent element 70 to which it is optically coupled, a low-resistance shunt in effect is provided across the electroluminescent element 70 of the first stage, which causes it to be deenergized. Accordingly, the photoconductive element 71 of the first stage, to which the element 70 is optically coupled, goes to a high-resistance state, and the electroluminescent element 69 of the first stage is turned "on."

Optically coupled to the electroluminescent element 69 of the first stage is the photoconductive element 72 of the second stage, which is therefore illuminated and assumes a low-resistance state. This provides a low-resistance shunt across the electroluminescent element 70 of the second stage, and deenergizes it, while causing the electroluminescent element 69 of the second stage to be energized. This sequence of operation is propagated from stage to stage through the circuit of FIG. 4 to the last "effective" stage.

When the electroluminescent element 70 of the last "effective" stage is deenergized, the photoconductive element 79 which is optically coupled thereto assumes a high-resistance condition, which is effective to cause the electroluminescent element 70 of the first stage to be energized once again, while the electroluminescent element 69 of the first stage is deenergized. Deenergization of the element 69 of the first stage causes the photoconductive element 72 of the second stage, to which it is optically coupled, to assume a high-resistance state. This in turn results in the energization of the electroluminescent element 70 of the second stage and the extinguishing of the element 69 of the second stage. The action described above is then propagated through the circuit from stage to stage.

It will thus be seen that a change in the energization state of the various electroluminescent elements of the circuit is continued so long as power is applied to the circuit and the switch 77 remains closed. Output signals may be taken from photoconductive elements 73 optically coupled to any of the electroluminescent elements 69 or 70 in accordance with the requirements of the system with which the circuit of FIG. 4 is being used. Also it will be seen that the frequency of the output signals can be altered as needed by changing the setting of the switch 78 to increase or decrease the number of "effective" stages in the circuit.

Figure 6:
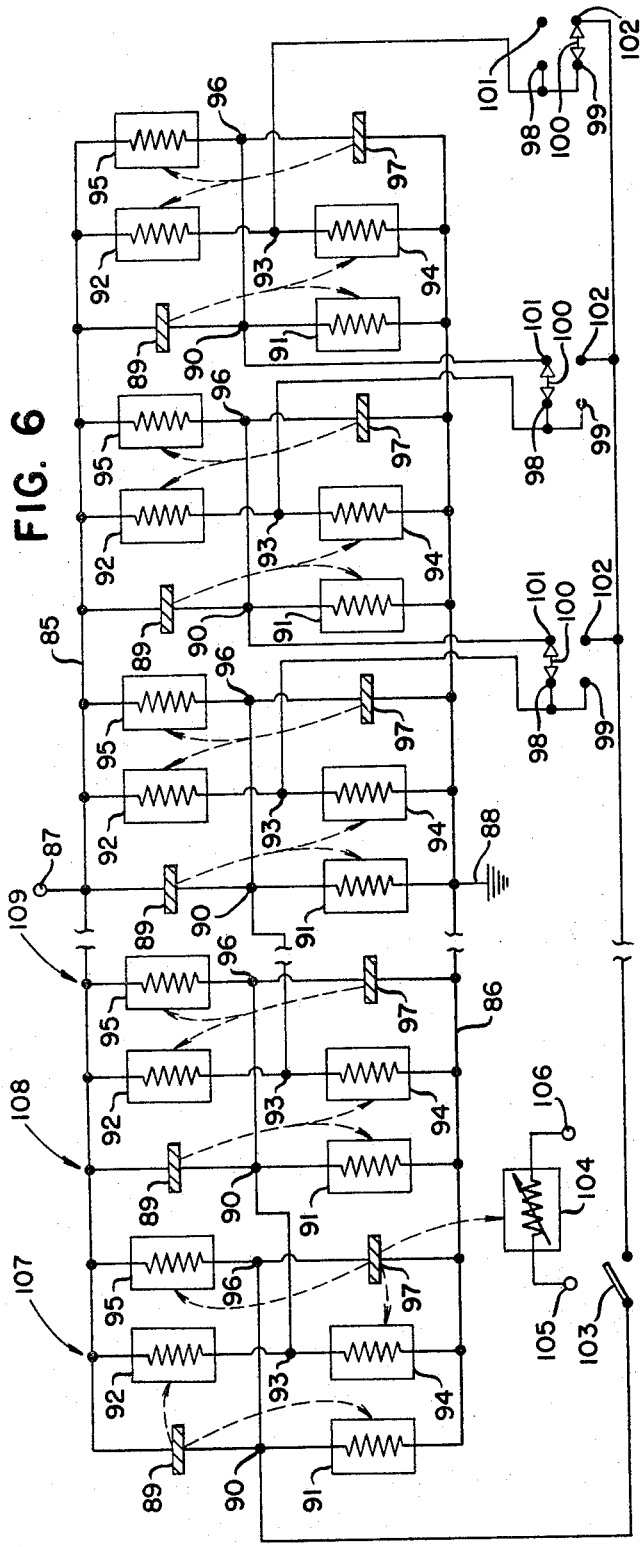
FIG. 6 is a schematic circuit diagram of a fourth form of electro-optical oscillator.

Another embodiment of an electro-optical oscillator constructed in accordance with the present invention is shown in FIG. 6. This circuit is somewhat more complex than those previously described, and incorporates what has been termed the "Ghandi" flip-flop, because, so far as is known, it was first described in the paper "Photoelectronic Circuit Applications," by Sorab K. Ghandi, published in the Proceedings of the I.R.E., volume 47, No. 1, January 1959, pages 4 to 11.

Included in this circuit are first and second common conductors 85 and 86, which are connected to a source of A.C. power, the conductor 85 being connected to a terminal 87 and the conductor 86 being connected to a base reference potential, shown as ground, at 88. Connected between the conductors 85 and 86 are a number of stages. A break is shown in the circuit to indicate that any desired number of stages can be included, depending upon the frequency of oscillation which is desired from the circuit. Each stage may be considered to include a first serial combination of an electroluminescent element 89, a point 90, and a photoconductive element 91; a second serial combination of a photoconductive element 92, a point 93, and a photoconductive element 94; and a third serial combination of a photoconductive element 95, a point 96, and an electroluminescent element 97. The points 90 and 96 of each stage are connected together.

Certain of the stages of the circuit of FIG. 6 differ from other stages of that circuit in certain respects, as will now be described. The points 93 of the first and second stages are connected to the points 90 of the next succeeding stages. On the other hand, in the case of the last three stages, the points 93 are connected to contacts 98 and 99 at one side of a switch 100, which has contacts 101 and 102 at its other side. Each of the contacts 101 is connected to the point 90 of a succeeding stage, and each of the contacts 102 is connected over a switch 103 to the point 90 of the first stage. The switch 103 is used to initiate and terminate the operation of the circuit of FIG. 6, as will subsequently be described. It will be noted that the number of "effective" stages in the circuit is determined by the setting of the switches 100 associated with certain of the stages. In the circuit depicted in FIG. 6, all of the stages shown are "effective," since the switch associated with the last stage is positioned to connect the contacts 99 and 102, while the switches of the other stages are positioned to connect the contacts 98 and 101, which in effect connects the points 93 and 90 of succeeding stages.

Optical coupling between elements differs in the first stage from that of other stages. The electroluminescent element 89 of the first stage is optically coupled to the photoconductive elements 91 and 92 of that stage, and the electroluminescent element 97 of the first stage is optically coupled to the photoconductive elements 94 and 95 of that stage. Also, the element 97 of the first stage is shown in FIG. 6 as optically coupled to a photoconductive output element 104, connected between terminals 105 and 106. Of course, it will be realized that the output element 104 could be optically coupled to any other electroluminescent element of the circuit, and that additional output elements could be provided if desired, in accordance with the output requirements for the circuit.

In the second and succeeding stages, the electroluminescent element 89 is optically coupled to the photoconductive elements 91 and 94, and the electroluminescent element 97 is optically coupled to the photoconductive elements 92 and 95.

Figure 7:
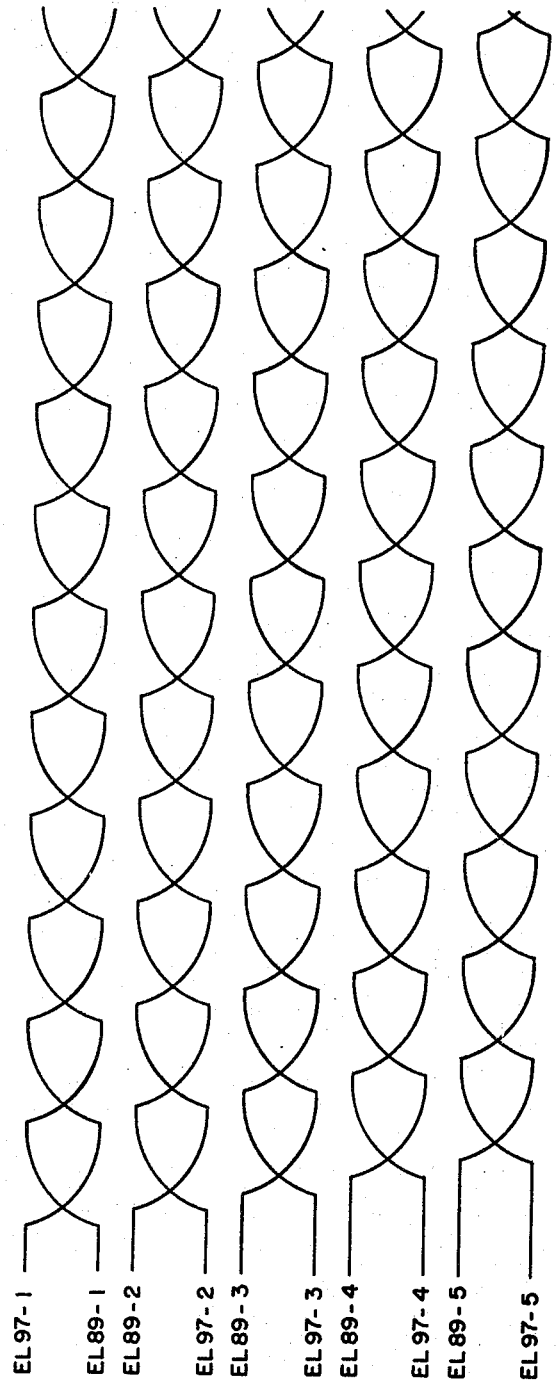
FIG. 7 shows a plurality of wave forms associated with various elements of the circuit shown in the diagram of FIG. 6.

Next, the mode of operation of the oscillator circuit of FIG. 6 will be described, with the aid of the wave forms shown in FIG. 7. These wave forms represent the intensity of radiation emitted by the electroluminescent elements in the circuit during a number of cycles of operation. Wave forms for the various electroluminescent elements are identified by the reference characters of the elements and the stages in which they are located. For example, a wave form designated "EL89–2" is associated with the electroluminescent element 89 in the second stage.

Let it first be assumed that the circuit of FIG. 6 is connected to a suitable power supply, and that the switch 103 is open. It will also be assumed that the electroluminescent element 97 of the first stage is energized, or "on," and that the electroluminescent element 89 of the first stage is deenergized, or "off." In such case, all of the electroluminescent elements 89 of the second and succeeding stages will be energized, or "on," while all of the electroluminescent elements 97 of the second and succeeding stages will be deenergized, or "off," due to the optical coupling between successive stages. It should be noted that the opposite could also be true; i.e., that the electroluminescent element 89 of the first stage could be "on," in which case the electroluminescent elements 97 of the first stage would be "off." In such a case, all of the electroluminescent elements 97 of the second and succeeding stages would be energized, or "on," and all of the electroluminescent elements 89 of the second and succeeding stages would be deenergized, or "off." If desired, the initial state of the elements could be controlled by proper choice in the selection of materials, the size of the elements, the degree of electro-optical coupling between elements, etc. In this connection, it may be noted that in any one "flip-flop," or stage, one electroluminescent element will always be "on," and the other will always be "off." A condition in which both elements are "half-on" will not persist for any appreciable length of time, due to the fact that variations in material, size, coupling, etc., of the elements will always cause one element to become dominant.

When the switch 103 is closed, a path is completed from the point 93 in the last stage over the contact 99 of said stage, the switch 100, the contact 102, and the switch 103, to the point 90 in the first stage. Due to the fact that the electroluminescent element 89 of the last stage is assumed to be energized, the photoconductive element 94 of that stage is illuminated and in a low-resistance condition. Potential at the point 93 of the last stage (and therefore potential of the point 90 of the first stage) is accordingly substantially at ground. This being the case, the electroluminescent element 97 of the first stage is deenergized, since there is no longer an appreciable potential difference across it, and the electroluminescent element 89 of the first stage is energized.

Energization of the element 89 causes the photoconductive element 91 of the first stage to be illuminated and to go to a low-resistance state, thereby "locking" the element 89 in an energized condition. In addition, the photoconductive element 92 of the first stage, to which the element 89 is optically coupled, is illuminated and goes to a low-resistance state. At the same time, illumination is removed from the elements 94 and 95 of the first stage by deenergization of the element 97, and the elements 94 and 95 accordingly change to a high-resistance state. In addition, the output element 104, which has been illuminated by the element 97, is now darkened and goes to a high-resistance state.

With the photoconductive elements 92 and 94 of the first stage in low- and high-resistance states, respectively, the potential at the point 93 of the first stage, and therefore the potential at the points 90 and 96 of the second stage, are substantially the same as the potential on the conductor 85.

The electroluminescent element 89 of the second stage is therefore deenergized, and the electroluminescent element 97 of the second stage is energized. The various photoconductive elements 91, 92, 94, and 95 of the second stage are accordingly changed in their resistance states.

This action is propagated from stage to stage along the circuit until it reaches the last stage. As the electroluminescent element 89 of the last stage is deenergized and the element 97 is energized, the states of the photoconductive elements 92 and 94 are reversed, so that the element 92 has a low resistance, while the element 94 has a high resistance. Accordingly, the potential at the point 93 of the last stage becomes substantially that of the conductor 85, and therefore so does the potential at the point 90 of the first stage. This is effective to deenergize the element 89 of the first stage and to energize the element 97 of that stage, thus initiating another cycle of oscillation of the circuit of FIG. 6. It will be seen that the oscillating action described above will continue until the switch 103 is opened.

Variation in the frequency of the output signal may be obtained by changing the settings of the switches 100 to alter the number of "effective" stages in the circuit. Decreasing the number of "effective" stages in the circuit increases the frequency of the output signal, and vice versa.

It will be obvious to one skilled in the art that the grouping in the embodiment of FIG. 6 described above of electroluminescent elements and photoconductive elements into stages is merely an arbitrary grouping for the purpose of convenience of description, and that other groupings of the elements into stages could be made, if desired. For example, all of the elements electrically connected by the common points 93, 90, and 96 could be considered to belong to the same stage. In such a grouping, the stages as shown in FIG. 6 would appear to be interspersed, with the rows of elements designated by the reference characters 107, 108, and 109 being in the same stage. It will be seen that the row of elements 107 includes the photoconductive element 92, the point 93, and the photoconductive element 94; the row of elements 108 includes the electroluminescent element 89, the point 90, and the photoconductive element 91; and the row of elements 109 includes the photoconductive element 95, the point 96, and the electroluminescent element 97. The actual construction and operation of the oscillator device of FIG. 6 would, of course, remain the same as previously described.

Figure 8:
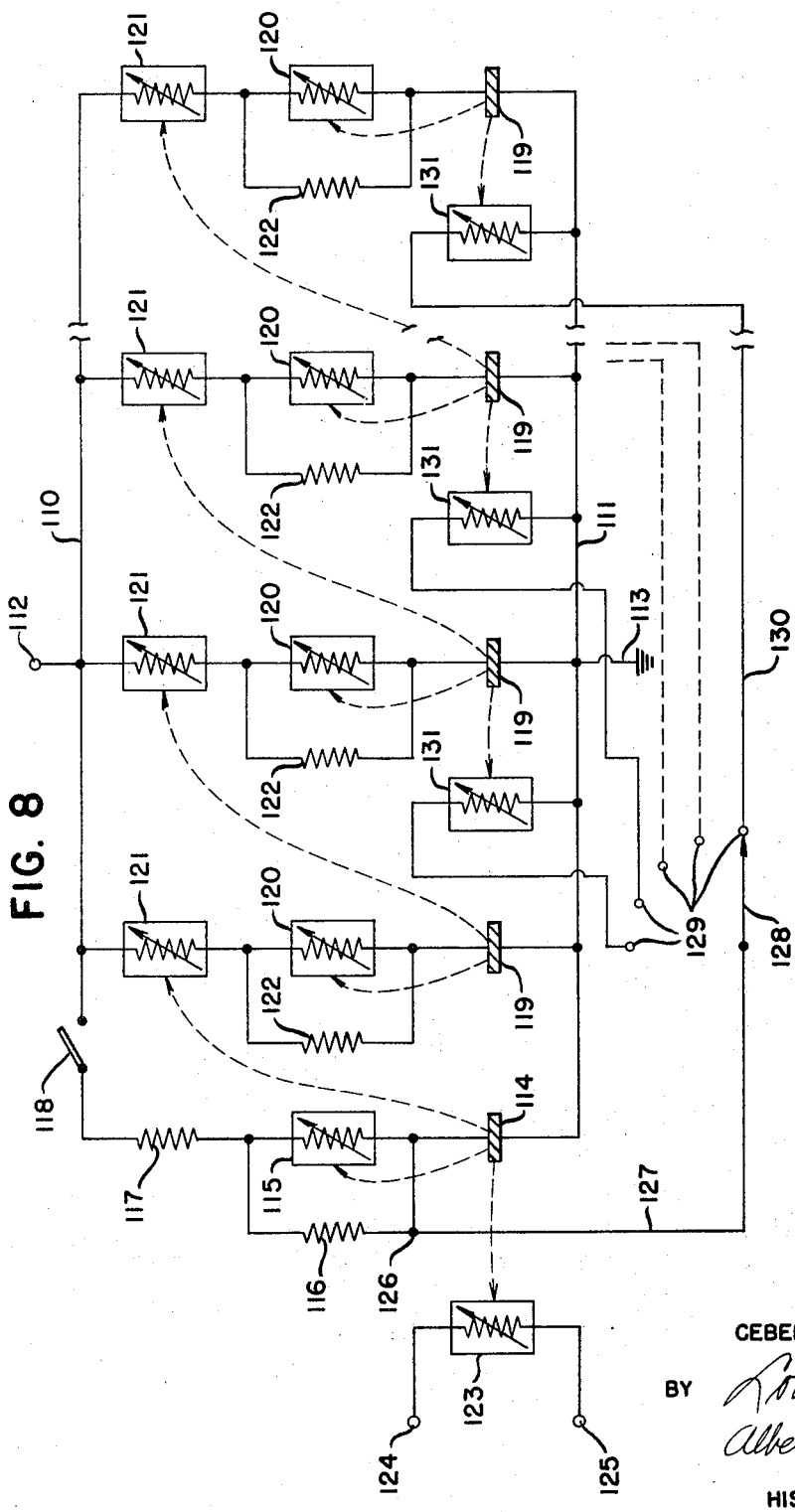
FIG. 8 is a schematic circuit diagram of a fifth form of electro-optical oscillator.

An additional embodiment of an electro-optical oscillator constructed in accordance with the present invention is shown in FIG. 8. In this circuit, two photoconductive elements are connected in series with the electroluminescent element of each stage.

First and second common conductors 110 and 111 are included in the circuit, and are connected to a source of A.C. power, the conductor 110 being connected to a terminal 112 and the conductor 111 being connected to a base reference potential, shown as ground, at 113. A number of similar stages are connected between conductors 110 and 111, and a break is shown in the circuit of FIG. 8 to indicate that any desired number of stages can be included, depending upon the frequency of oscillation of the circuit which is desired.

The first stage differs slightly from the remaining stages and includes, in series, an electroluminescent element 114, a parallel combination of a photoconductive element 115 and a resistor 116, and a resistor 117. A switch 118 connects one end of the resistor 117 to the conductor 110, and is used to initiate and terminate the operation of the circuit of FIG. 8.

The second and succeeding stages include a serial combination of an electroluminescent element 119 and two photoconductive elements 120 and 121. A resistor 122 is connected in parallel with the photoconductive element 120. The electroluminescent element 119 of each of the second and succeeding stages is optically coupled to the photoconductive element 120 of the same stage and to the photoconductive element 121 of the next succeeding stage.

The electroluminescent element 114 of the first stage is optically coupled to the photoconductive element 115 of the first stage, to the photoconductive element 121 of the second stage, and to a photoconductive output element 123, which is connected between terminals 124 and 125, from which may be taken an output signal. As has been previously mentioned in connection with the descriptions of other embodiments of the invention, the output element 123 may be optically coupled to any of the electroluminescent elements fo the circuit, and more than one output element may be employed, if desired.

From a point 126 at a junction of the photoconductive element 115 and the resistor 116 in the first stage, a path extends over a conductor 127 to the common, or wiper, of a multiple-position switch 128 having a plurality of contacts 129. From each contact 129, a path extends over a conductor 130 and a photoconductive element 131 to the conductor 111. Each of the photoconductive elements 131 is optically coupled to an electroluminescent element 119 of one of the stages. The number of "effective" stages in the circuit, and therefore the frequency of oscillation of the circuit, is determined by the setting of the switch 128. In the circuit as depicted in FIG. 8, all of the stages shown are "effective," since the wiper of the switch 128 is set to the contact 129 associated with the photoconductive element 131 which is optically coupled to the electroluminescent element 119 of the last stage.

Figure 9:
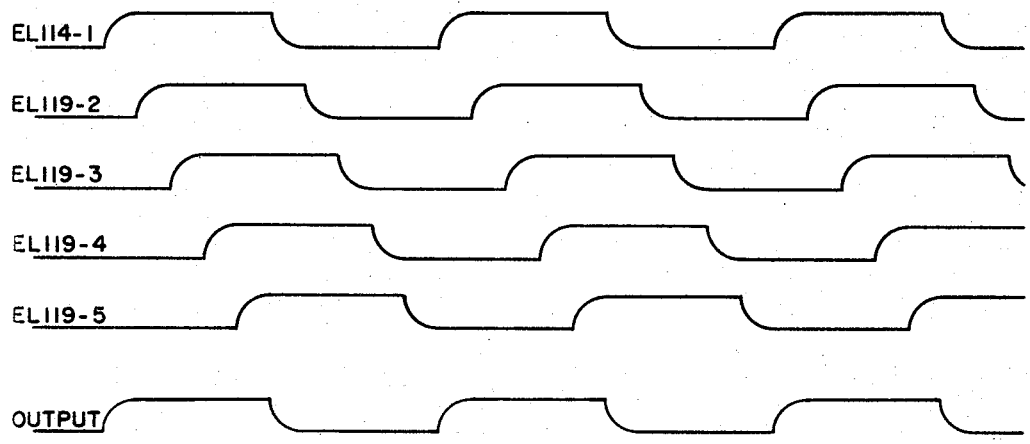
FIG. 9 shows a plurality of wave forms associated with the various elements of the circuit shown in the diagram of FIG. 8, when said circuit is set for a relatively long period of oscillation.
Figure 10:
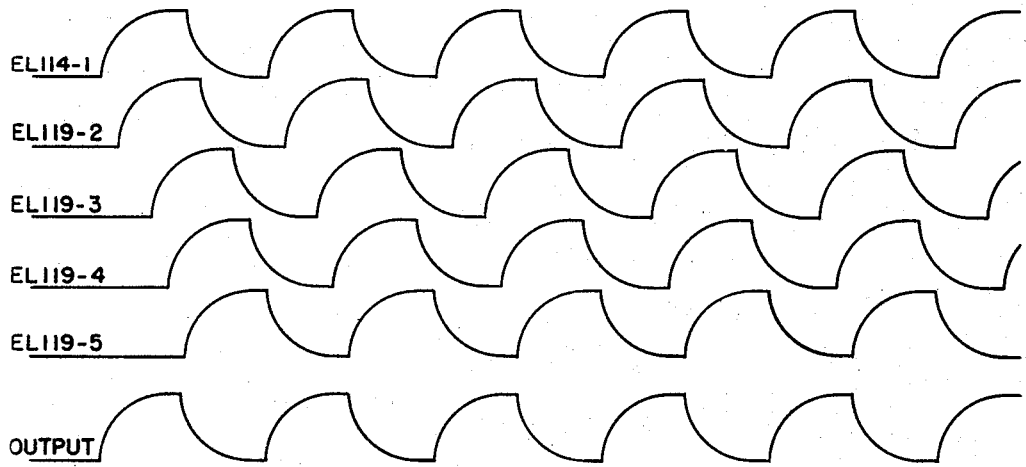
FIG. 10 shows a plurality of wave forms associated with various elements of the circuit shown in FIG. 8 when said circuit is set for a relatively short period of oscillation.

The manner in which the oscillator circuit of FIG. 8 functions will now be described with the aid of the wave forms shown in FIGS. 9 and 10. The wave forms of FIG. 9 represent the conditions of the various elements when the switch 128 of FIG. 8 is set to provide a maximum number of "effective" stages, while the wave forms of FIG. 10 represent the conditions of the various elements when the switch 128 of FIG. 8 is set to provide a maximum number of "effective" stages, while the wave forms of FIG. 10 represent the conditions of the various elements when the switch 128 is set to provide a lesser number of "effective" stages. Wave forms for the various electroluminescent elements represent the intensity of radiation emitted thereby, and are identified by reference characters of the elements and the stages in which they are located. For example, the wave forms in both FIGS. 9 and 10 designated "EL119-2" are associated with the electroluminescent element 119 in the second stage. The wave forms designated "OUTPUT" in FIGS. 9 and 10 represent the intensity of radiation falling upon the photoconductive output element 123, which, it will be recalled, is optically coupled to the electroluminescent element 114 of the first stage. This wave form, in both FIGS. 9 and 10, is thus identical to the wave form for the electroluminescent element 114 of the first stage, and represents the inverse of the resistance of the photoconductive element 123.

It will first be assumed that the circuit of FIG. 8 is connected to a suitable power supply, and that the switch 118 is open. In such a case, all of the electroluminescent elements of the first and successive stages are in an "off" or deenergized condition. The electroluminescent element 114 of the first stage is "off," since the circuit path to it has been interrupted by opening of the switch 118, and the electroluminescent elements 119 of the second and succeeding stages are "off," because the resistance of the photoconductive elements 120 and 121, and of the resistors 122 in parallel with the elements 120, are sufficient to reduce the potential difference across the elements 119 to a level below that required to energize said elements.

When the switch 118 is closed, the electroluminescent element 114 of the first stage is energized, since the resistors 116 and 117 are of sufficiently low resistance to provide a potential across the element 114 adequate to energize it. The photoconductive element 115 of the first stage is accordingly illuminated and in a low-resistance state, as is the photoconductive element 121 of the second stage. Illumination of the element 115 "locks" the element 114 in an energized condition, and illumination of the element 121 energizes the electroluminescent element 119 of the second stage, due to the relatively low resistance of the resistor 122 in parallel with the photoconductive element 120 of that stage. Energization of the electroluminescent element 119 of the second stage illumintes the photoconductive element 120 of that stage to "lock" on said element 119, and also illuminates the photoconductive element 121 of the third stage, which is effective to energize the element 119 of the third stage. This action propagates through the circuit of FIG. 8, to the last "effective" stage, shown in this case as the rightmost stage in FIG. 8.

Energization of the electroluminescent element 119 of this stage causes the photoconductive element 131, to which it is optically coupled, to be illuminated and thus go to a low-resistance state. A low-resistance path is thus completed from the ground connection 113 over the conductor 111, the photoconductive element 131 associated with the last stage, the conductor 130, the contact 129, the switch 128, the conductor 127, and the point 126 to the upper side of the first stage electroluminescent element 114. Since the other side of this element is also at ground, there is no appreciable potential difference across the element 114, and it is accordingly deenergized. This causes illumination of the first stage photoconductive element 115 and the second stage photoconductive element 121 to cease, so that both of these elements go to a high-resistance state. Accordingly, the "lock" on the first stage electroluminescent element 114 is broken, and also the second stage electroluminescent element 119 is deenergized by the increase in resistance of the element 121. This action is propagated through the circuit, with the electroluminescent elements 119 of successive stages being deenergized until the last "effective" stage is reached.

Deenergization of the electroluminescent element 119 of the last "effective" stage causes the photoconductive element 131 associated therewith to be darkened and to go to a high-resistance state. This, in effect, interrupts the low-resistance path to the point 126, and causes the electroluminescent element 114 of the first stage to be energized once again, which in turn causes the electroluminescent element 119 of the second stage to be energized, and so on. An output signal is taken from the circuit by the photoconductive element 123, said signal having a periodic characteristic in accordance with the successive energization and deenergization of said electroluminescent element 114, as indicated in FIG. 9.

It will be seen that the successive energization and deenergization of the electroluminescent elements of the various stages continues as long as the switch 118 remains closed, and terminates when that switch is opened.

Now, if the setting of the switch 128 is changed to another contact 129, such as, for example, the leftmost contact 129 shown in FIG. 8, the action of the circuit is the same, but each electroluminescent element remains energized for a shorter period of time, due to the element 114 being deenergized more rapidly, as indicated in FIG. 10, because there are now fewer "effective" stages in the circuit. The output signal is changed accordingly, as is also shown in FIG. 10.

While the forms of circuitry shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. An electro-optical oscillator device capable of producing a periodically repeated output signal of predetermined frequency comprising, in combination, a plurality of stages, including a first stage and a group of succeeding stages, with said succeeding stages being identical to one another, and with each said stage including at least a serial combination of a radiation-sensitive element and a radiation-emitting element capable of assuming either a high-level radiation-emitting state or a low-level radiation-emitting state, with optical coupling of elements between stages; said radiation-emitting element and radiation-sensitive element of said first stage also being optically coupled to each other;

means for applying power to said plurality of stages;

said first stage being operable to initiate sustained operation of said oscillator device;

radiation-sensitive reset means associated with certain of said succeeding stages and operably connected to said first stage to effect a sequence of operation in which the radiation-emitting elements of the first and succeeding stages are reset from one state to the other; and output means associated with at least one of the radiation-emitting elements, on which an output signal appears.

2. The device of claim 1, also including switch means cooperating with said radiation-sensitive reset means and adapted to be selectively positioned so as to operatively connect a selected one of said radiation-sensitive reset means with said first stage to vary the frequency of oscillation of said oscillator device.

3. The device of claim 1, in which the radiation-emitting elements are electroluminescent elements.

4. The device of claim 1, in which the radiation-sensitive elements are photoconductive elements.

5. The device of claim 2, in which each said radiation-sensitive reset means includes a radiation-sensitive element which is optically coupled to the pertaining said radiation-emitting element of its respective stage.

6. The device of claim 1, in which said succeeding stages comprise a group of identical stages and a final stage, with each of said stages having said serial combination of a radiation-sensitive element and a radiation-emitting element; each said identical stage and said final stage including a second radiation-sensitive element, with the radiation-emitting element of each one of said group of identical stages being optically coupled to said second radiation-sensitive element of the same stage and to the radiation-sensitive element of said serial combination of the next succeeding stage of said group of identical stages; the radiation-emitting element of the last one of said identical stages being optically coupled to the radiation-sensitive element of said serial combination of said final stage, and with said radiation-emitting element of said final stage being optically coupled to said second radiation-sensitive element of said final stage and to said radiation-sensitive reset means.

7. The device of claim 6 in which said radiation-sensitive reset means is adaptable to be optically coupled with a particular one of the radiation-emitting means of said group of identical stages to thereby vary the frequency of oscillation of said oscillator device.

8. The device of claim 6, in which the radiation-emitting elements are electroluminescent elements.

9. The device of claim 6, in which the radiation-sensitive elements and the radiation-sensitive reset means are photoconductive elements.

10. The device of claim 1 in which said succeeding stages comprise a group of identical stages and a final stage, with each of said stages having said serial combination of a first radiation-sensitive element and a first radiation-emitting element, each said identical stage and said final stage having, in addition, a second serial combination of a second radiation-sensitive element and a second radiation-emitting element in which the first radiation-emitting element of each one of said identical stages is optically coupled to the first radiation-sensitive element of the next succeeding one of said identical stages, and in which the second radiation-emitting element of each of said identical stages is optically coupled to the second radiation-sensitive element of the same stage; said second radiation-emitting element of each of said identical stages and said final stage being connected in parallel to the first radiation-sensitive element of its respective stage; said first radiation-emitting element of each of said identical stages and said final stage being connected in parallel with the second radiation-sensitive element of its respective stage; said first stage having a second radiation-emitting element which is connected in parallel with the first radiation-sensitive element of that stage and which is optically coupled to said first radiation-sensitive element of the first one of said identical stages; said first radiation-emitting element of the last stage of said identical stages being optically coupled to the first radiation-sensitive element of said final stage, and said second radiation-emitting element of at least certain stages of said group of stages and said final stage being optically coupled to said radiation-sensitive reset means.

11. The device of claim 10, also including switch means cooperating with said radiation-sensitive reset means and adapted to be selectively positioned so as to operatively connect a selected one of said radiation-sensitive reset means with said first stage to vary the frequency of oscillation of said oscillator device.

12. The device of claim 10, in which the radiation-emitting elements are electroluminescent elements.

13. The device of claim 10, in which the radiation-sensitive elements and the radiation-sensitive reset means are photoconductive elements.

14. The device of claim 1 in which said succeeding stages comprise a group of identical stages and a final stage, with each of said stages having said serial combination of a first radiation-sensitive element and a first radiation-emitting element; all said stages having, in addition, a second serial combination of a second radiation-emitting element and a second radiation-sensitive element in parallel with said first combination, and a third serial combination of a third and fourth radiation-sensitive element connected in parallel with said first and second serial combinations; the radiation-emitting element of said first serial combination of said first stage being optically coupled to the radiation-sensitive element of that serial combination and to the fourth radiation-sensitive element of the third serial combination of that stage, the second radiation-emitting element of said second serial combination of said first stage being optically coupled to the second radiation-sensitive element of that serial combination, the junction between said elements of said first serial combination of said first stage being connected to the junction between said elements of said second serial combination of said first stage; the junction between said elements of said third serial combination of said first stage being connected to the junction between said elements of said first combination of the first one of said group of stages; the radiation-emittting element of said first serial combination of each stage of said group of stages and of said final stage being optically coupled to the first radiation-sensitive element of that combination and to the third radiation-sensitive element of said third serial combination of their respective stages, the second radiation-emitting element of said second serial combination of each stage of said group of stages and said final stage being optically coupled to the second radiation-sensitive element of that stage and the fourth radiation-sensitive element of the third serial combination of that stage; the junction between said elements of said first serial combination of each stage of said group of stages and of said final stage being connected to the junction between said elements of said second serial combination of their respective stages, the junction between said elements of said third serial combination of each stage of said group of stages being connected to the junction between said elements of said first serial combination of the succeeding one of said group of stages; the junction between said elements of said third serial combination of the last one of said group of stages being connected to the junction between said elements of said first serial combination of said final stage; said third serial combination of radiation-sensitive elements being included in said radiation-sensitive reset means; the junction between said elements of said third serial combination of said final stage being connected to the junction between said elements of said first serial combination of said first stage.

15. The device of claim 14, also including switch means cooperating with said third serial combination of elements of each stage of said group of stages and final stage and operable to vary the frequency of oscillation of said oscillator device.

16. The device of claim 14, in which the radiation-emitting elements are electroluminescent elements.

17. The device of claim 14, in which the radiation-sensitive elements are photoconductive elements.

18. The device of claim 1 in which said succeeding stages comprise a group of identical stages and a final stage, with each of said stages having said serial combination of a first radiation-sensitive element and a radiation-emitting element, each stage of said group of stages and said final stage having, in addition, a parallel combination of a second radiation-sensitive element and a resistor in series with said serial combination of their respective stages, the radiation-emitting element of said first stage being optically coupled to the radiation-sensitive element of that stage and to the first radiation-sensitive element of the first one of said group of stages; the radiation-emitting element of each of the stages of said group being optically coupled to the second radiation-sensitive element of that stage of the group and to the first radiation-sensitive element of the succeeding one of said stages of said group, the radiation-emitting element of the last stage of said group being optically coupled to the first radiation-sensitive element of said final stage, the radiation-emitting element of said final stage being optically coupled to the second radiation-sensitive element of that stage, and each said radiation-sensitive reset means being optically coupled to the radiation-emitting element of that particular one of said stages with which it is associated.

19. The device of claim 18, also including switching means cooperating with said radiation-sensitive reset means and adapted to selectively positioned so as to operatively connect a selected one of said radiation-sensitive reset means with said first stage to vary the frequency of oscillation of said oscillator device.

20. The device of claim 18, in which the radiation-emitting elements are electroluminescent elements.

21. The device of claim 18, in which the radiation-sensitive elements and the radiation-sensitive reset means are photoconductive elements.

References Cited

UNITED STATES PATENTS

| | | | |
|---|---|---|---|
| 3,020,410 | 2/1962 | Bowerman | 250—208 |
| 3,235,735 | 2/1966 | Blank | 331—107 X |

OTHER REFERENCES

Haining: "Triggerable Flip-Flop Circuit with Electroluminescent and Photoconductive Elements," RCA Technical Notes, RCA in No. 390, June 1960.

ROY LAKE, *Primary Examiner.*

J. B. MULLINS, *Assistant Examiner.*

UNITED STATES PATENT OFFICE
CERTIFICATE OF CORRECTION

Patent No. 3,353,116                                      November 14, 1967

Cebern B. Trimble

It is hereby certified that error appears in the above numbered patent requiring correction and that the said Letters Patent should read as corrected below.

Column 18, line 12, after "said" insert -- succeeding --.

Signed and sealed this 7th day of January 1969.

(SEAL)
Attest:

Edward M. Fletcher, Jr.                               EDWARD J. BRENNER
Attesting Officer                                            Commissioner of Patents